United States Patent [19]

La Bate

[11] 4,251,322

[45] * Feb. 17, 1981

[54] PROCESS FOR TREATING COKE OVEN DOORS AND JAMBS TO PREVENT THE BUILD UP OF TAR THEREON

[76] Inventor: Michael D. La Bate, 115 Hazen Ave., Ellwood City, Pa. 16117

[ * ] Notice: The portion of the term of this patent subsequent to Feb. 5, 1997, has been disclaimed.

[21] Appl. No.: 59,306

[22] Filed: Jul. 20, 1979

Related U.S. Application Data

[63] Continuation-in-part of Ser. No. 948,886, Oct. 5, 1978, Pat. No. 4,187,335, which is a continuation-in-part of Ser. No. 905,513, May 15, 1978, abandoned.

[51] Int. Cl.³ .................... B08B 17/02; C10B 25/16
[52] U.S. Cl. ................................ 201/2; 106/38.22; 106/38.28; 201/41; 202/248; 202/269; 427/135; 427/318; 427/327; 427/427
[58] Field of Search ............... 201/2, 41, 18; 202/242, 202/248, 269, 241; 106/38.22, 38.28, 2, 307; 427/427, 135, 327, 318

[56] References Cited

U.S. PATENT DOCUMENTS

| | | | |
|---|---|---|---|
| 2,246,463 | 6/1941 | Garratt | 427/318 |
| 3,875,018 | 4/1975 | Calderon | 202/269 X |
| 4,039,337 | 8/1977 | Brown et al. | 106/38.28 |
| 4,097,304 | 6/1978 | Taylor | 201/2 |
| 4,098,929 | 7/1978 | Badone et al. | 427/318 |
| 4,111,709 | 9/1978 | Price et al. | 202/269 X |
| 4,187,335 | 2/1980 | La Bate | 427/318 |

FOREIGN PATENT DOCUMENTS 284218  6/1929  United Kingdom ............. 428/457

*Primary Examiner*—Arnold Turk
*Attorney, Agent, or Firm*—Webster B. Harpman

[57] ABSTRACT

A process of treating coke oven doors and jambs with a material containing micro micron particles of graphite in a liquid carrier is described that forms a penetrating lubricating adhesive coating on the coke oven doors and jambs which acts to prevent leakage of tar and other coke by-products as heretofore common in the art and the resultant inability of maintaining a sealing relation between the doors and jambs.

8 Claims, No Drawings

PROCESS FOR TREATING COKE OVEN DOORS AND JAMBS TO PREVENT THE BUILD UP OF TAR THEREON

This is a continuation in part of Ser. No. 948,886, filed Oct. 5, 1978 now U.S. Pat. No. 4,187,335, issued Feb. 5, 1980, a continuation-in-part of Ser. No. 905,513 filed May 15, 1978 now abandoned.

BACKGROUND OF THE INVENTION (1) Field of the Invention:

This invention relates to coke ovens and the doors thereon and the manner of sealing the doors with respect to the jambs during the coking operation.

(2) Description of the Prior Art:

Coke ovens are provided at their opposite ends with self-sealing doors that depend on a metal to metal contact between the door and the continuous machine surfaced cast iron jamb.

In a typical example the sealing edge of the door is carried by a flexible frame and the door assembly includes a powerful spring between the door and the locking bar to force the sealing edge against the metal door jamb to prevent the escape of volatile products from the oven. Such door and jamb assemblies on the coke side and pusher side of the coke ovens commonly fail to maintain a sealing metal to metal relation and tar and other by-products produced during the coking operation escape and build up between the door and the jamb and must be manually removed each time the doors are removed and repositioned when the coke is pushed from the oven. The tar and by-products build up deposits which are difficult to remove and the removal is time consuming so that frequently the doors are repositioned and the desirable sealing relation to effect an efficient coking operation is adversely affected.

The present invention relates to a process of building up a penetrating coating on the sealing edges of the doors and jambs with a material that is not affected by the heat of the coking operation and to which tar and other by-products will not adhere with the result that the sealing edges of the doors and the jambs which are engaged thereby remain clean and free of tar and other by-product build up. The material used in the process forms a penetrating and lubricating adhesive coating on the coke oven doors and jambs.

No prior art is known which relates to a material capable of such use or a process of using it.

SUMMARY OF THE INVENTION

A process and material for treating coke oven doors and the like to prevent the build up of tar and other coke oven by-products on the doors and jambs comprising the coating of the doors and jambs as by spraying or other application of a material which is essentially micro micron particles of graphite in a liquid carrier wherein the extremely fine size of the micro micron graphite particles lowers the surface tension of the liquid carrier and enables the graphite to penetrate the metal surfaces of the coke oven doors and jambs and build up a smooth adhering coating. The liquid carrier comprises water, an aqueous sodium silicate solution and hydrochloric acid, a water soluable resin, such as carboxy vinyl polymer as a dry fluffy acid powder is power mixed with the micro micron graphite particles and the liquid carrier to obtain a suitable solution.

DESCRIPTION OF THE PREFERRED EMBODIMENT

The material of this invention is particularly suitable for building up penetrating and lubricating adhesive smooth coatings on coke oven doors and jambs and comprises between about 5% to 25% by weight micro micron particles of graphite, between about 34% to 75% of a solution of water and sodium silicate ($Na_2Si_3O_7$), wherein the sodium silicate is present at about 40% of the solution, between about 2% to 10% concentrated hydrochloric acid of a 90% purity, by weight, between about 33% to 75% of a solution of water and carboxy vinyl resin wherein the resin is present in amounts between about 1% to 10% of the solution by weight, and between about 15% to 20% water by weight.

The particle size of the micro micron graphite particles being about one-millionth of a micron sized particle. A micron sized particle is between 0.2 and 10 millionths of a meter. The carboxy vinyl resin powder has a specific gravity of 1.41 and a bulk density of 13 lbs. per cubic foot. It is available as "CARBOPOL" and low concentrations mixed with water as herein disclosed produce a thin gel-like liquid with penetrating and adhesive qualities.

Those skilled in the art will observe that the liquid carrier as set forth hereinbefore comprises an effective wetting agent which contributes to the ability of the micro micron particles of graphite to penetrate the metal of the coke oven doors and jambs.

Those skilled in the art will observe that the percentages of the micro micron particles of graphite in the liquid carrier perform effectively when a number of applications of the material are applied and when only one or a few applications of the materials are applied to the metal surfaces, then the highter percentages of the micro micron particles of graphite are more desirable.

In either case the material penetrates the metal surfaces being treated and builds up an extemely smooth slick coating to which the tar and by-products from the coke oven will not adhere or if some adherence occurs the adhering material may be easily removed by air or water or other fluid jets.

In using the material disclosed herein the process involves mixing the materials to form a liquid suspension of the micro micron particles of graphite and then spraying the same by any suitable spraying equipment on cleaned metal surfaces of the coke oven doors and jambs to be treated. One or more coating are applied as necessary to build up a smooth unbroken surface of the material on the metal members being treated and the material may be applied to the metal sufaces while they are either hot or cold. The ability of the material to applied to the hot metal surfaces is particularly advantageous in a coke oven operation as the doors are removed from the ovens to permit a pusher to move the coke from the ovens while the ovens themselves are maintained at or near coking temperatures.

Those skilled in the art will observe that the heretofore necessary manual cleaning of the doors and door jambs frequently requiring motorized buggies and similar mechanical equipment and the time of such cleaning is eliminated through the use of the process hereinbefore disclosed.

It will also be observed that the production of metallurgical coke is improved and stabilized by providing for the effective sealing of the coke oven doors made possible by the material and process herein disclosed.

It has been determined that other applications and uses of the process are possible and such may include the treating of forging dies used in the hot forging of metals and the treatment of various metal handling and processing equipment wherein the surface condition of the metal treating equipment is desirably maintained in a smooth condition resisting adhesion of contaminates thereto. Additionally ingot molds are advantageously treated with the material of the invention and the process of application thereof as such treatment expedites the stripping of ingots from the molds.

The following specific examples of the material have been found satisfactory:

A. Substantially 8% by weight micro micron particles of high purtity synthetic graphite, substantially 7% by weight concentrated hydrochloric acid of substantially 90% purity, substantially 18% by weight water ($H_2O$), substantially 34% by weight aqueous sodium silicate solution wherein the $Na_2Si_3O_7$ is present at about 40% by weight of the solution and substantially 33% by weight water soluable carboxy vinyl polymer resin as a powder wherein the resin is present at substantially 8% by weight of the solution.

B. Substantially 8% by weight micro micron particles of high purity synthetic graphite, substantially 7% by weight concentrated hydrochloric acid of substantially 90% purity, substantially 18% by weight water ($H_2O$), substantially 67% by weight aqueous sodium silicate solution wherein the $Na_2Si_3O_7$ is present at about 40% by weight of the solution.

C. Substantially 8% by weight micro micron particles of high purity synethtic graphite, substantially 7% by weight concentrated hydrochloric acid of substantially 90% purity, substantially 18% by weight water ($H_2O$), substantially 67% by weight aqueous solution of carboxy vinyl polymer resin as a powder wherein the resin is present at substantially 8% by weight of the aqueous solution.

An alternate liquid carrier has been found to produce a suitable suspension of the micro micron particles of graphite and substitutes xanthan gum, a natural high molecular weight linear polysaccharide, functioning as a hydrophilic colloid to maintain the micro micron particles of graphite in suspension and contribute to the penetrating lubricating adhesive coating as described hereinbefore.

A specific example of such an alternate material follows:

D. Substantially 8% by weight micro micron particles of high purity synthetic graphite, substantially 7% by weight concentrated hydrochloric acid of substantially 90% purity, substantially 18% by weight water ($H_2O$), substantially 67% by weight aqueous solution of xanthan gum as a powder wherein the gum is present at substantially 8% by weight of the aqueous solution.

Variations in the amounts of xanthan gum may be used as from 1% to 10% of the aqueous solution.

The treatment of ingot molds hereinbefore referred to by the process and with the material disclosed herein obtains the desired results by reason of the material and the manner of application. Specifically it is known in the art that molten steel in an ingot mold takes carbon from the metal of the ingot mold thereby adversely affecting the interior of the mold by removing the portions thereof and it is also known that when this occurs the stripping of the cooled ingot from the mold becomes more difficult because of the interlock obtained between the solidified metal and the irregular surface of the mold. By heating an ingot mold the grain structure enlarges and the porosity of the metal increases and in the present process the material is preferably applied to the ingot mold when it is heated as by spraying or dipping the heated mold in the liquid suspension material. Under such conditions the micro micron particles of graphite aided by the liquid carrier penetrates the metal surfaces of the ingot mold which have been previously cleaned and build up a smooth lubricating and adhering coating which being largely graphite is then able to supply carbon that molten steel absorbs usually from the ingot mold. Thus the treating material is sacrificed to some degree and the inner surface of the ingot mold retained in its desirable smooth condition. Stripping ingots from the smooth inner surface of the mold is thus considerably expedited and the molds last considerably longer as the carbon from the metal of the molds is not sacrificed as has heretofore been common in the art.

Although the embodiments of the present invention have been limited as described hereinbefore, it will be apparent to those skilled in the art that various changes and modifications may be made therein without departing from the spirit of the invention and having thus described my invention what I claim is:

I claim:

1. A process of treating the engaging portions of steel coke oven doors and jambs that consists essentially of the steps of cleaning said portions of said doors and jambs to the bare metal, penetrating a liquid suspension of micro micron particles of graphite into said portions, said liquid suspension including at least 5% to 25% micro micron size particles of graphite, applying enough of said liquid suspension of graphite to form a smooth covering coating on said metal portions and building up sufficient excess of graphite on said portions to effectively seal a door to a jamb during operation of an oven.

2. The process of claim 1 and wherein several penetrating coatings of said liquid suspension of micro micron particles of graphite are applied to said metal portions successively.

3. The process of claim 1 and wherein several penetrating coatings of said liquid suspension of micro micron particles of graphite are sprayed to said metal successively.

4. The process of treating metal coke oven doors and jambs as set forth in claim 1 and wherein the doors and jambs are heated to a temperature at which the grain structure expands and the porosity of the metal increases and wherein the liquid suspension of micro micron particles of graphite is applied to the heated doors and jambs.

5. The process of claim 1 and wherein liquid suspension includes sodium silicate.

6. The process of claim 1 and wherein the liquid suspension includes carboxy vinyl polymer resin.

7. The process of claim 1 and wherein the liquid suspension includes carboxy vinyl resin and sodium silicate.

8. The process of claim 1 and wherein the liquid suspension includes xanthan gum and sodium silicate.

* * * * *